(12) United States Patent
Barbarossa (10) Patent No.: US 7,257,325 B1
(45) Date of Patent: Aug. 14, 2007

(54) METHOD AND SYSTEM FOR MONITORING MULTIPLE OPTICAL COMMUNICATIONS LINES

(75) Inventor: Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 714 days.

(21) Appl. No.: 10/439,631

(22) Filed: May 16, 2003

Related U.S. Application Data (60) Provisional application No. 60/413,063, filed on Sep. 24, 2002.

(51) Int. Cl.
*H04B 10/08* (2006.01)

(52) U.S. Cl. ............... 398/28; 398/12; 398/20; 398/33

(58) Field of Classification Search .......... 398/27, 398/33–35, 140–142, 12, 20, 28
See application file for complete search history.

(56) References Cited

U.S. PATENT DOCUMENTS

| | | | | |
|---|---|---|---|---|
| 4,535,440 A | * | 8/1985 | Mannschke ............... | 398/44 |
| 4,939,482 A | * | 7/1990 | Nergaard et al. ........ | 398/200 |
| 5,305,412 A | * | 4/1994 | Paoli ...................... | 385/122 |
| 5,712,716 A | * | 1/1998 | Vanoli et al. ........... | 398/34 |
| 5,745,634 A | * | 4/1998 | Garrett et al. .......... | 385/140 |
| 5,970,201 A | * | 10/1999 | Anthony et al. ........ | 385/140 |
| 6,236,478 B1 | * | 5/2001 | Stoll ....................... | 398/27 |
| 6,341,024 B1 | * | 1/2002 | Jeong ..................... | 398/87 |
| 6,633,430 B1 | * | 10/2003 | Monnard et al. ....... | 359/337.11 |
| 6,771,905 B1 | * | 8/2004 | Bortz ..................... | 398/45 |
| 6,931,196 B2 | * | 8/2005 | Livas et al. ............ | 385/140 |
| 2001/0048537 A1 | * | 12/2001 | Sussman et al. ....... | 359/110 |
| 2002/0041735 A1 | * | 4/2002 | Cai et al. ................ | 385/37 |
| 2002/0131690 A1 | * | 9/2002 | Belser et al. ........... | 385/24 |

OTHER PUBLICATIONS

U.S. Appl. No. 60/413,063, Barbarossa, Giovanni, filed Sep. 24, 2002.

* cited by examiner

*Primary Examiner*—Leslie Pascal
(74) *Attorney, Agent, or Firm*—Patterson & Sheridan, LLP (57) ABSTRACT

The present invention provides a method and system for monitoring composite optical signals carried over plural fiber-optic lines within an optical network. Methods and systems in accordance with the present invention each utilize a single OPM to monitor each one of a set of sample proportions of composite signals split off from respective fiber-optic lines. In one embodiment, an optical performance monitoring system comprises a plurality of fiber-optic lines, each fiber-optic line carrying a respective composite optical signal, a plurality of optical taps, each optical tap being optically coupled to a respective one of the fiber-optic lines and splitting a portion of the composite optical signal thereof, a plurality of optical switches, each optical switch being optically coupled to a respective one of the optical taps and comprising either an Open configuration and a Closed configuration, an optical coupler, and an Optical Performance Monitor (OPM).

20 Claims, 5 Drawing Sheets

METHOD AND SYSTEM FOR MONITORING MULTIPLE OPTICAL COMMUNICATIONS LINES

RELATED U.S. APPLICATION DATA

This application claims priority from U.S. Provisional Application Ser. No. 60/413,063, filed on Sep. 24, 2002.

FIELD OF THE INVENTION

The present invention relates to fiber optic networks, and more particularly to monitoring the performance of fiber optic networks carrying wavelength division multiplexed optical signals.

BACKGROUND OF THE INVENTION

Fiber optic networks are becoming increasingly popular for data transmission due to their high speed, high capacity capabilities. As the traffic on fiber optic networks increases, monitoring and management of the networks become increasingly more significant issues. An established method for increasing the carrying capacity of existing fiber cable is Wavelength Division Multiplexing (WDM) in which multiple information channels are independently transmitted over the same fiber using multiple wavelengths of light. In this practice, each light-wave-propagated information channel corresponds to light within a specific wavelength range or "band." In this document, these individual information-carrying lights of a WDM optical fiber, optical line or optical system are referred to as either "signals" or "channels" and the totality of multiple combined signals, wherein each signal is of a different wavelength range, is referred to as a "composite optical signal." To monitor the network, the spectral characteristics of the composite signal at particular points in the network must be determined and analyzed. This information may then be used to alter the performance of the network if the signal characteristics are less than optimal.

Figure 1:
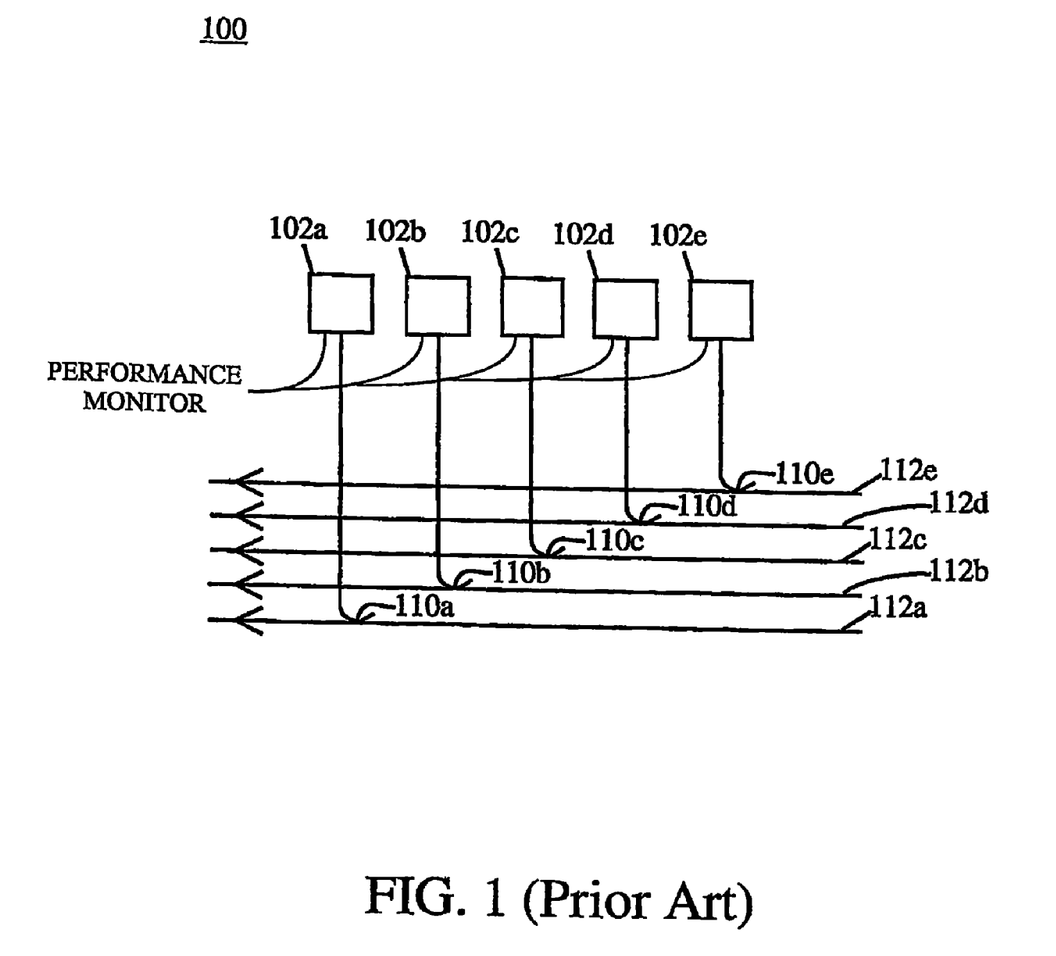
FIG. 1 illustrates a conventional system for monitoring the characteristics of multiple composite optical signals within plural fiber-optic lines.

FIG. 1 illustrates a conventional system for monitoring the characteristics of a plurality of composite optical signals, wherein each composite optical signal is transmitted along a respective fiber-optic line from among a plurality of fiber-optic lines. The conventional system 100 shown in FIG. 1 comprises a set of fiber optic lines 112a-112e, a set of Optical Performance Monitors (OPM's) 102a-102e and a set of optical taps 110a-110e. Each optical tap is optically coupled to a respective one of the fiber optic lines and splits off a small sampled proportion (typically ca. 1-2%) of the composite optical signal carried by said line to a respective one of the OPM's. For instance, a sample of a first composite optical signal (COS) transmitted along fiber optic line 112a is split off by optical tap 110a to the OPM 102a. Similarly, a separate sample of a different COS transmitted along fiber optic line 112b is split off by optical tap 110b to the OPM 102b, etc.

Each one of the OPM's 102a, 102b, etc. comprising the conventional system 100 continuously measures important spectral characteristics of the sampled COS delivered to it. Such spectral characteristics may include the number of active channels comprising each COS, the absolute and relative intensities of the channels and the wavelengths of the channels. Since each OPM is optically coupled to one and only one fiber optic line, via a respective optical tap, each OPM is dedicated to monitoring the spectral parameters of a particular fiber optic line and there are as many OPM's as there are fiber optic lines.

Although the conventional optical performance monitoring system 100 can adequately perform its intended functions, the dedication of each OPM to a single fiber optic line add a significant degree of cost to the installation and operation of a fiber optic network. Optical performance monitors are typically complex and relatively expensive instruments, comprising finely adjusted wavelength dispersion elements such as diffraction gratings as well as a plurality of photo-detectors, associated control electronics and software. The level of OPM duplication provided in the conventional system 100 multiplies the costs required to set up the network. Further, each OPM may, periodically require re-calibration or adjustment. Thus, maintenance costs are likewise multiplied.

Accordingly, there exists a need for method and system for an optical performance monitor that is constructed with less duplication of apparatus than is the conventional system and that can operate more cost-efficiently than the conventional system. The present invention addresses such a need.

SUMMARY OF THE INVENTION

The present invention provides a method and system for monitoring a plurality of composite optical signals carried over plural fiber-optic lines within an optical network. Methods and systems in accordance with the present invention each utilize a single OPM to monitor each one of a set of sample proportions of composite optical signals split off from respective fiber-optic lines.

A first preferred embodiment of an optical performance monitoring system in accordance with the present invention comprises a plurality of fiber-optic lines, each fiber-optic line carrying a respective composite optical signal, a plurality of optical taps, each optical tap being optically coupled to a respective one of the fiber-optic lines and splitting a portion of the composite optical signal thereof, a plurality of optical switches, each optical switch being optically coupled to a respective one of the optical taps and comprising either an Open configuration and a Closed configuration, an optical coupler, a plurality of switch output optical lines optically coupled between the optical coupler and each one of the optical switches, an Optical Performance Monitor (OPM) and an optical coupler output optical line optically coupled between the optical coupler and the OPM.

A second preferred embodiment of an optical performance monitoring system in accordance with the present invention comprises a plurality of fiber-optic lines, each fiber-optic line carrying a respective composite optical signal, a plurality of optical taps, each optical tap being optically coupled to a respective one of the fiber-optic lines and splitting a portion of the composite optical signal thereof, a plurality of variable optical attenuators (VOA's), each VOA being optically coupled to a respective one of the optical taps, an optical coupler, a plurality of VOA output optical lines optically coupled between the optical coupler and each one of the VOA's, an Optical Performance Monitor (OPM) and an optical coupler output optical line optically coupled between the optical coupler and the OPM.

A first preferred embodiment of a method for optical performance monitoring in accordance with the present invention comprises the steps of (a) selecting a first optical switch from amongst a sequence of optical switches optically coupled to respective fiber-optic lines; (b) setting all switches except the selected switch to their Open positions and setting the selected switch to its Closed position; (c) routing a sample proportion of a COS carried by the fiber-optic line optically coupled to the selected switch through the selected switch to an OPM and monitoring the sample proportion of the COS using the OPM; (d) selecting the next switch in the sequence or, if the currently selected switch is the last switch, selecting the first switch in the sequence; and (e) repeating each of steps (b) through (d) indefinitely so that the single OPM monitors, in turn, sample proportions of each of the COS's split off from each respective fiber-optic line.

A second preferred embodiment of a method for optical performance monitoring in accordance with the present invention comprises the steps of (a) selecting a first VOA from amongst a sequence of VOA's optically coupled to respective fiber-optic lines; (b) setting all VOA's except the selected VOA to operate with maximum attenuation and setting the selected VOA to operate with minimum attenuation; (c) routing a sample proportion of a COS carried by the fiber-optic line optically coupled to the selected VOA through the selected VOA to an OPM and monitoring the sample proportion of the COS using the OPM; (d) selecting the next VOA in the sequence or, if the currently selected VOA is the last VOA, selecting the first VOA in the sequence; and (e) repeating each of steps (b) through (d) indefinitely so that the single OPM monitors, in turn, sample proportions of each of the COS's split off from each respective fiber-optic line.

DETAILED DESCRIPTION

The present invention provides an improved method and system for monitoring a composite optical signal in a fiber optic network. The present invention improves cost efficiency of constructing and maintaining fiber optic networks by utilizing a single OPM to monitor each one of a set of sample proportions of composite optical signals split off from respective fiber-optic lines. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein. To more particularly describe the features of the present invention, please refer to the appended FIGS. 2 through 5 in conjunction with the discussion below.

Figure 2:
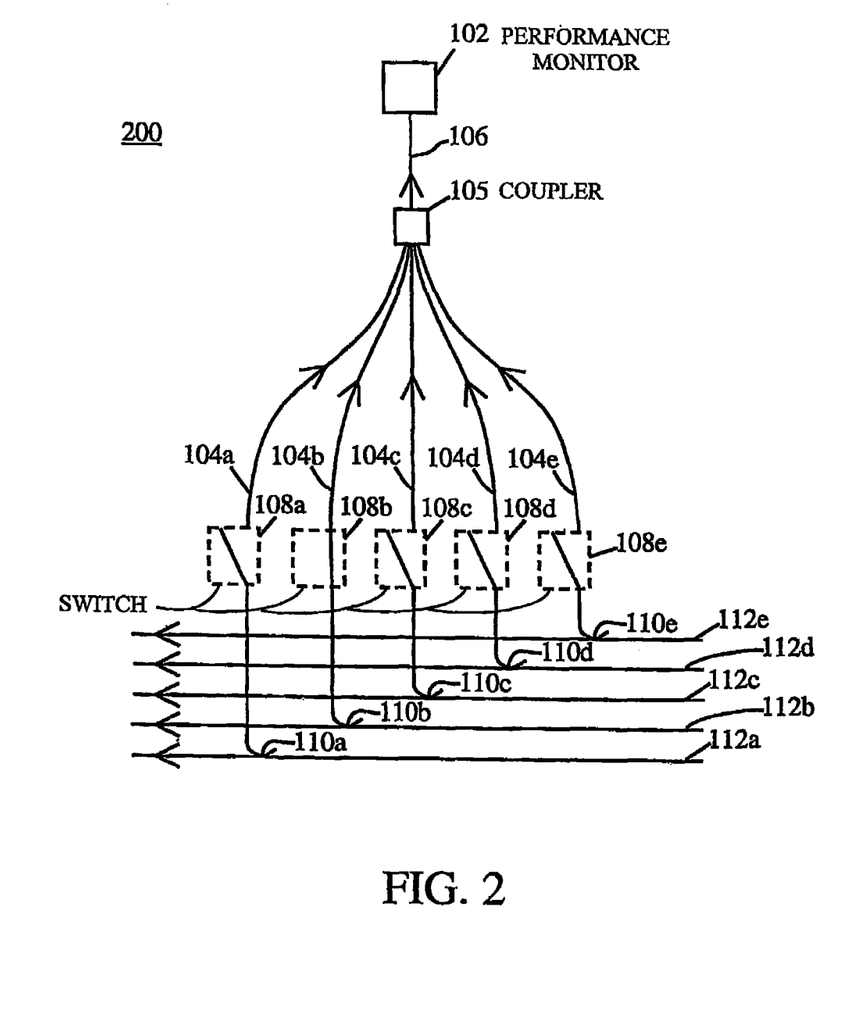
FIG. 2 illustrates a first preferred embodiment of a system for monitoring the characteristics of multiple composite optical signals within plural fiber-optic lines in accordance with the present invention.

FIG. 2 illustrates a first preferred embodiment of an optical performance monitoring system in accordance with the present invention. The system 200 shown in FIG. 2 is capable of monitoring the characteristics of multiple composite optical signals utilizing a single OPM. The system 200 comprises a set of fiber optic lines 112a-112e; a set of optical taps 110a-110e, each one of which being optically coupled to a respective one of the fiber optic lines; a set of optical switches 108a-108e, each being optically coupled to respective one of the optical taps; an optical coupler 105; a plurality of switch output optical lines 104a-104e optically coupled between the optical coupler 105 and each one of the optical switches 108a-108e; an OPM 102 and an optical coupler output optical line 106 optically coupled between the optical coupler 105 and the OPM 102.

Each one of the fiber-optic lines 112a-112e comprising the system 200 carries a different respective COS. Each one of the optical taps 110a-110e splits off a small sample proportion (ca. 1-2%) of the composite optical signal carried by the fiber-optic line to which it is coupled and delivers said sample proportion to a respective one of the optical switches 108a-108e. Each such optical switch may comprise two alternative positions or configurations—an Open position and a Closed position. In its Open position, a switch does not transmit an optical signal therethrough; in its Closed position, the switch transmits a sample proportion of a COS to a respective one of the switch output optical lines 104a-104e. Only one of the optical switches 108a-108e is in the Closed position at any one time. For instance, in FIG. 2, only the switch 108b is illustrated in its Closed position and the other four optical switches 108a, 108c, 108d and 108e are shown in their Open positions.

Only the sample proportion of a COS that is delivered to the one optical switch in its Closed position is transmitted though one of the switch output optical lines 104a-104e to the optical coupler. However, the switches are cycled through their Open and Closed configurations so that each one of the optical switches 108a-108e is in its Closed configuration for a certain time duration. Subsequently, each switch is returned to its Open configuration and the next switch in sequence is cycled into its Closed position, etc. Therefore, a sample proportion of each COS split off from a respective one of the fiber-optic lines is delivered, in turn to the optical coupler 105. The optical coupler 105 may comprise a well-known fiber-optic fused star coupler, a planar light guide star coupler, or a multiplexer and is capable of delivering optical signals from each of the switch output optical lines 104a-104e to the optical coupler output optical line 106 and then to the OPM 102. The single OPM 102 thus monitors the sample proportion from each one of the fiber optic lines 112a-112e, in turn.

Figure 3:
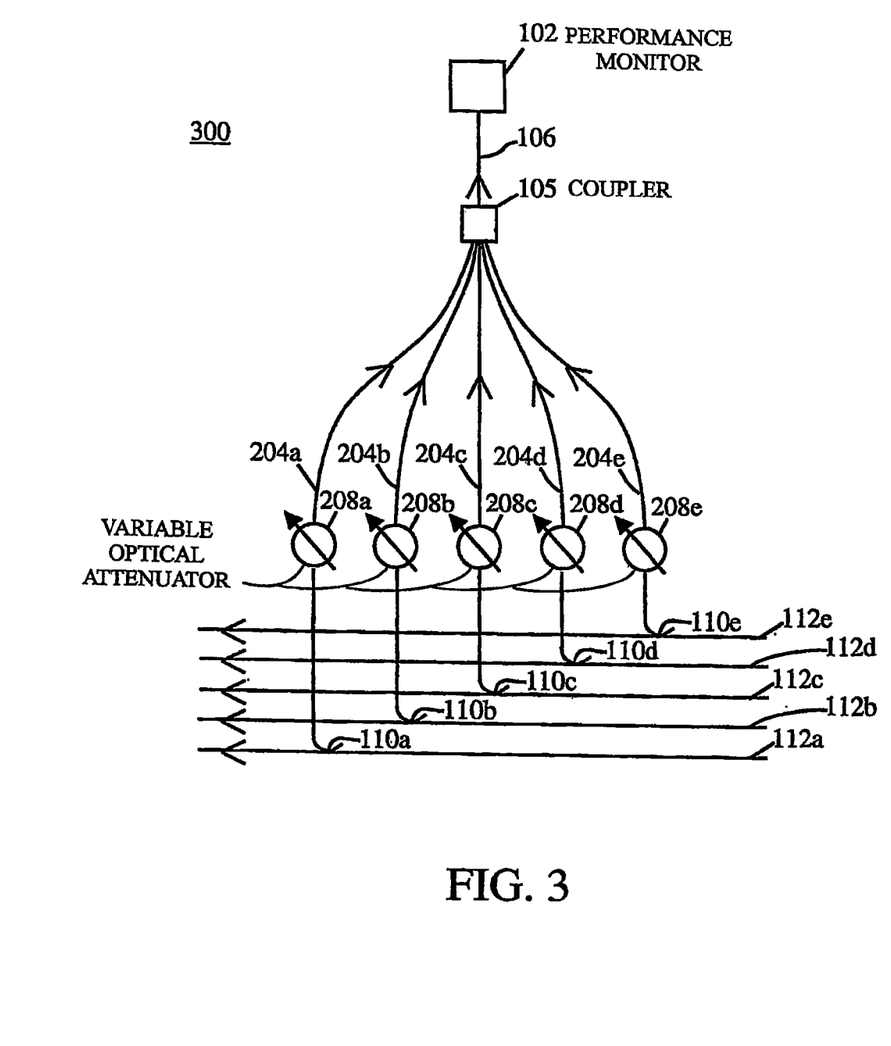
FIG. 3 illustrates a second preferred embodiment of a system for monitoring the characteristics of multiple composite optical signals within plural fiber-optic lines in accordance with the present invention.

FIG. 3 illustrates a second preferred embodiment of an optical performance monitoring system in accordance with the present invention. The system 300 shown in FIG. 3 is constructed and operates similarly to the system 200 (FIG. 2) except that the set of optical switches is replaced by a set of VOA's 208a-208e, wherein each VOA is optically coupled to a respective one of the optical taps 110a-110e and to a respective one of the VOA output optical lines 204a-204e. The VOA's are cycled between their maximum attenuation and minimum attenuation settings, with only one VOA at its minimum attenuation setting at any one time. Therefore, transmission of a sample proportion of a COS only occurs substantially through one VOA at a time; transmission through the VOA's set for maximum attenuation is substantially blocked. Various types of VOA's are known and are commercially available.

Figure 4:
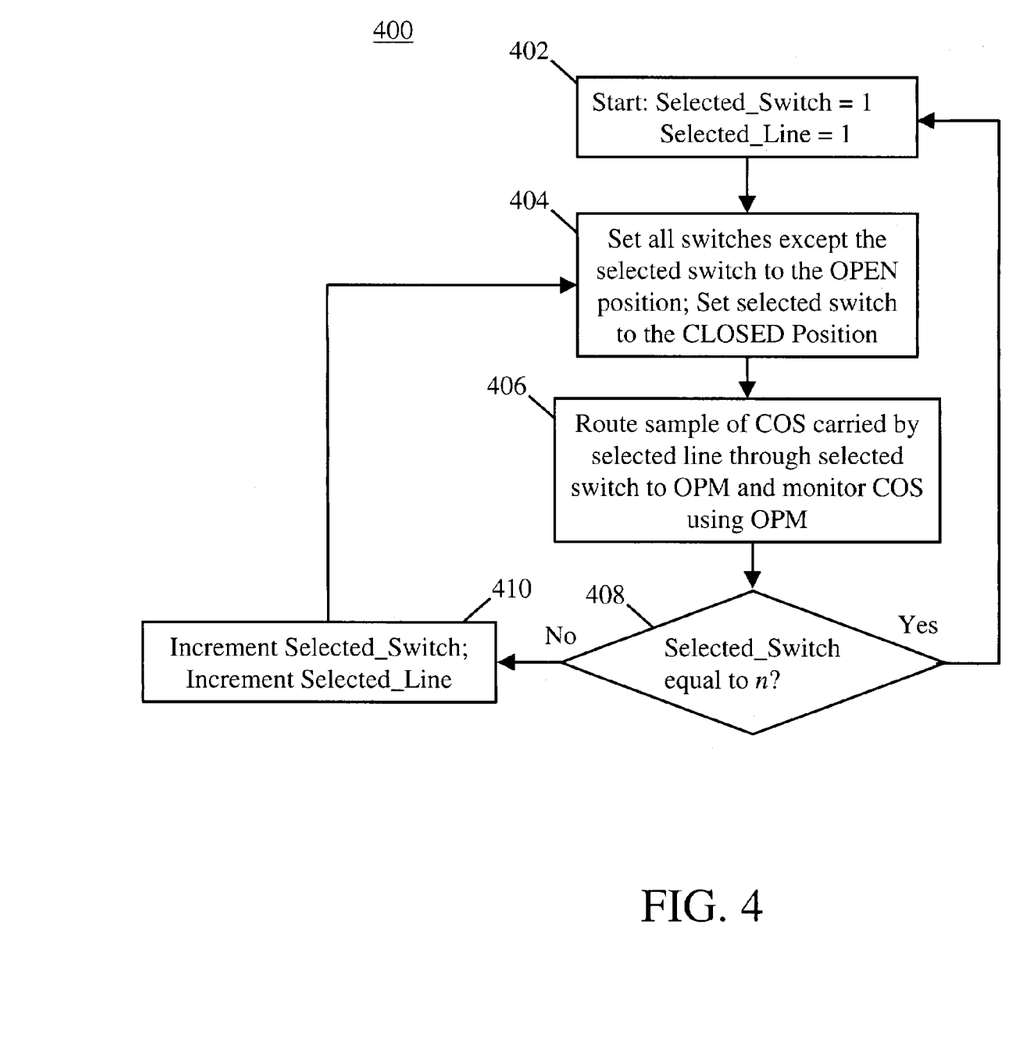
FIG. 4 illustrates a first method for monitoring the characteristics of multiple composite optical signals within plural fiber-optic lines in accordance with the present invention.

FIG. 4 illustrates a first method 400 for monitoring the characteristics of multiple composite optical signals within plural fiber-optic lines in accordance with the present invention. In the initialization step 402 of method 400, there is selected a first switch (switch number 1) of a plurality of n sequentially numbered switches, wherein each switch is optically coupled to a respective one of n sequentially numbered fiber optic lines and receives a sampled proportion of a COS from the respective line. Let the currently selected switch be represented by the numeric variable "Selected_Switch" and the fiber optic line to which it is coupled be represented by the numeric variable "Selected_Line". Therefore, the initialization step 402 sets Selected_Switch=1 and also sets Selected_Line=1—that is, it sets both the selected switch to the first switch and the selected line to the first fiber optic line. The selected switch is optically coupled to the selected line.

The method 400 continues from Step 402 to Step 404, wherein all of the plurality of switches except for the selected switch are set to their Open positions and only the selected switch is set to its Closed position. This step has the effect of rendering the selected switch (i.e., the switch referenced by the variable Selected_Switch) as the only one that permits substantial transmission of optical signals therethrough.

The method 400 continues from Step 404 to Step 406, wherein a sampled proportion of the composite optical signal (COS) carried by the selected line (i.e., the line referenced by the variable Selected_Line) is routed through the selected switch to an OPM optically coupled to all of the plurality of switches. At this time, the OPM monitors the COS from only the selected line via the sampled proportion directed to it through the selected switch.

The method 400 continues from Step 406 to the decision step, Step 408, wherein a determination is made as to whether or not the selected switch is the last switch of the plurality of switches—that is, whether or not the variable Selected_Switch is equal to n. If the selected switch is not the last switch, then the method 400 branches from Step 408 to Step 410, wherein the next switch in sequence becomes the new selected switch (through the incrementing of the variable Selected_Switch) and the next fiber optic line becomes the selected line. This new selected line is optically coupled to the new selected switch. If, in the decision step 408, the selected switch is indeed the last switch in the sequence, then the method 400 branches from Step 408 back to Step 402. Subsequently, the method 400 steps from either Step 410 or Step 402 to Step 404 and then loops indefinitely, such that the COS from each line is monitored by the single OPM, in turn.

Figure 5:
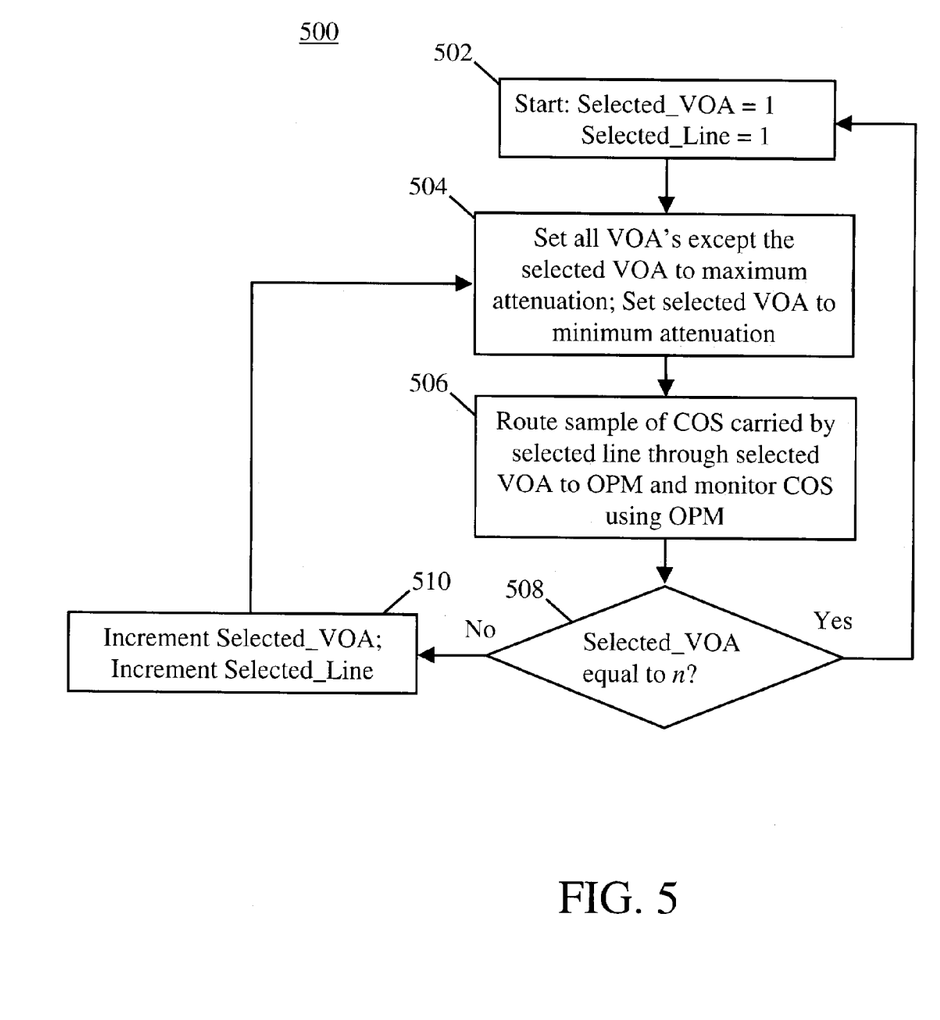
FIG. 5 illustrates a second method for monitoring the characteristics of multiple composite optical signals within plural fiber-optic lines in accordance with the present invention.

FIG. 5 illustrates a second method 500 for monitoring the characteristics of multiple composite optical signals within plural fiber-optic lines in accordance with the present invention. In the initialization step 502 of method 500, there is selected a first VOA (VOA number 1) of a plurality of n sequentially numbered VOA's, wherein each VOA is optically coupled to a respective one of n sequentially numbered fiber optic lines. Let the currently selected VOA be represented by the numeric variable "Selected_VOA" and the fiber optic line to which it is coupled be represented by the numeric variable "Selected_Line". Therefore, the initialization step 502 sets Selected_VOA=1 and also sets Selected_Line=1—that is, it sets both the selected VOA to the first VOA and the selected line to the first fiber optic line. The selected VOA is optically coupled to the selected line.

The method 500 continues from Step 502 to Step 504, wherein all of the plurality of VOA's except for the selected VOA are set so as to provide maximum attenuation and the selected VOA is set to provide minimum attenuation. This step has the effect of rendering the selected VOA as the only one that permits substantial transmission of optical signals therethrough. Transmission through all other VOA's is substantially blocked.

The method 500 continues from Step 504 to Step 506, wherein a sample of the composite optical signal (COS) carried by the selected line is routed through the selected VOA to an OPM optically coupled to all of the plurality of VOA's. At this time, the OPM monitors the COS from only the selected line via the sampled proportion directed to it through the selected VOA. Transmission through all other VOA's is substantially blocked.

The method 500 continues from Step 506 to the decision step, Step 508, wherein a determination is made as to whether or not the selected VOA is the last VOA of the plurality of VOA's—that is, whether or not the variable Selected_VOA is equal to n. If the selected VOA is not the last VOA, then the method 500 branches from Step 508 to Step 510, wherein the next VOA becomes the new selected VOA (by incrementing the variable Selected_VOA) and the next fiber optic line becomes the selected line. This new selected line is optically coupled to the new selected VOA. If, in the decision step 508, the selected VOA is indeed the last VOA in sequence, then the method 500 branches from Step 508 back to Step 502. Subsequently, the method 500 steps from either Step 510 or Step 502 to Step 504 and then loops indefinitely, such that the COS from each line is monitored by the single OPM, in turn.

A method and system for a monitoring multiple composite optical signals in a fiber optic network have been disclosed. The method and system of the present invention utilizes a single optical performance monitor to determine spectral characteristics and parameters of each one of a set of composite optical signals split off from respective fiber-optic lines. By eliminating un-necessary redundant optical performance monitors utilized in conventional systems, the optical performance monitoring systems and methods in accordance with the present invention substantially improve the cost efficiency of constructing and maintaining an optical network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the invention as defined by the appended claims.

I claim:

1. A system for monitoring multiple optical communications lines, comprising:
    an optical performance monitor having an input;
    an optical coupler having an input and an output, the output of the optical coupler directly coupled to the input of the optical performance monitor via an optical line;
    a first optical switch having an input for receiving a first composite optical signal and an output directly coupled to the optical coupler via a first optical line, the first optical switch having an OPEN position and a CLOSED position;
    a second optical switch having an input for receiving a second composite optical signal and an output directly coupled to the optical coupler via a second optical line, the second optical switch having an OPEN position and a CLOSED position, wherein one of the optical switches, either the first optical switch or the second optical switch, is in the CLOSED position at any one time;

a first optical tap directly coupled to the first optical switch for receiving the first composite optical signal and splitting a portion of the first composite optical signal to the first optical switch; and a second optical tap directly coupled to the second optical switch for receiving the second composite optical signal and splitting a portion of the second composite optical signal to the second optical switch.

2. The system of claim 1, further comprising a third optical switch having an input for receiving a third composite optical signal and an output optically couple to the optical coupler, the third optical switch having an OPEN position and a CLOSED position; wherein one of the of the optical switches, either the first optical switch the second optical switch or the third optical switch, is in the CLOSED position at any one time.

3. The system of claim 2, further comprising:
a third optical tap optically coupled to the third optical switch for receiving a third composite optical signal and splitting a portion of the third composite optical signal to the third optical switch.

4. The system of claim 1, wherein the optical coupler is configured to deliver an optical signal from each switch to the optical performance monitor.

5. The system of claim 1, wherein the optical coupler is a planar light guide star coupler.

6. A system for monitoring multiple optical communications lines, comprising:

an optical performance monitor having an input;

an optical coupler having an input and an output, the output of the optical coupler directly coupled to the input of the optical performance monitor via an optical line;

a first variable optical attenuator having an input for receiving a first composite optical signal and an output directly coupled to the optical coupler via a first optical line, the first variable optical attenuator being cycled between a maximum attenuation and a minimum attenuation;

a second variable optical attenuator having an input for receiving a second composite optical signal and an output directly coupled to the optical coupler via a second optical line, the second variable optical attenuator being cycled between a maximum attenuation and a minimum attenuation wherein one of the variable optical attenuators, either the first variable optical attenuator or the second variable optical attenuator, is at its minimum attenuation setting at any one time;

a first optical tap directly coupled to the first variable optical attenuator for receiving the first composite optical signal and splitting a portion of the first composite optical signal to the first variable optical attenuator; and a second optical tap directly coupled to the second variable optical attenuator for receiving the second composite optical signal and splitting a portion of the second composite optical signal to the second variable optical attenuator.

7. The system of claim 6, further comprising a third variable optical attenuator having an input for receiving a third composite optical signal and an output optically coupled to the optical coupler, the third variable optical attenuator being cycled between a maximum attenuation and a minimum attenuation; wherein one of the of the variable optical attenuators, either the first variable optical attenuator, the second variable optical attenuator, or the third variable optical attenuator, is at its minimum attenuation setting at any one time.

8. The system of claim 7, further comprising:
a third optical tap optically coupled to the third variable optical attenuator for receiving a third composite optical signal and splitting a portion of the third composite optical signal to the third variable optical attenuator.

9. A method for monitoring multiple optical communications lines, comprising:

receiving a first composite optical signal and splitting a portion of the first composite optical signal to a first optical switch;

receiving a second composite optical signal and splitting a portion of the second composite optical signal to a second optical switch;

routing one of the portions from either the first composite optical signal or the second composite optical signal through a coupler to an optical performance monitor; and routing another portion from either the first composite optical signal or the second composite optical signal through the coupler to the optical performance monitor.

10. The method of claim 9, further comprising:
receiving a third composite optical signal by a third optical switch; and
routing a composite optical signal from either the first composite optical signal, the second composite optical signal or the third composite optical signal to the optical performance monitor.

11. The method of claim 10, between the steps of receiving and routing, further comprising:
splitting a portion of the third composite optical signal to the third optical switch.

12. The method of claim 9, wherein the coupler is directly coupled to the optical monitor via an optical line.

13. The method of claim 9, wherein each switch is directly coupled to the coupler via a separate optical line.

14. A method for monitoring multiple optical communications lines, comprising:

receiving a first composite optical signal and splitting a portion of the first composite optical signal to a first variable optical attenuator;

receiving a second composite optical signal and splitting a portion of the second composite optical signal to a second variable optical attenuator;

routing one of the portions from either the first composite optical signal or the second composite optical signal through a coupler to an optical performance monitor; and routing another portion from either the first composite optical signal or the second composite optical signal through the coupler to the optical performance monitor.

15. The method of claim 14, further comprising:
receiving a third composite optical signal by a third variable optical attenuator; and
routing a composite optical signal from either the first composite optical signal, the second composite optical signal or the third composite optical signal to the optical performance monitor.

16. The method of claim 15, further comprising:
splitting a portion of the third composite optical signal to the third variable optical attenuator.

17. The method of claim 14, wherein each attenuator is directly coupled to the coupler via an optical line.

18. A system for monitoring multiple optical communications lines, comprising:

an optical performance monitor having an input;

an optical coupler having an input and an output, the output of the optical coupler directly coupled to the input of the optical performance monitor; and a plurality of switching means having inputs receiving a plurality of composite optical signals and having outputs directly coupled to the output of the optical coupler, each of the plurality of switching means receiving a portion of a corresponding composite optical signal from the plurality of composite optical signals, each of the plurality of switching means having an ON position and an OFF position;

wherein one of the plurality of switching means is in the ON position at any one time while the remaining plurality of switching means are in the OFF positions.

19. The system of claim 18, wherein the plurality of switching means comprise a plurality of optical switches.

20. The system of claim 18, wherein the plurality of switching means comprise a plurality of variable optical attenuators.

* * * * *